(12) United States Patent
Joos et al.

(10) Patent No.: US 7,836,865 B2
(45) Date of Patent: Nov. 23, 2010

(54) METHOD FOR FUEL INJECTION

(75) Inventors: Klaus Joos, Walheim (DE); Jens Wolber, Gerlingen (DE); Ruediger Weiss, Moetzingen (DE); Timm Hollmann, Benningen A.N. (DE); Manfred Dietrich, Markgroeningen (DE); Peter Schenk, Ludwigsburg (DE); Erkan Danisman, Kernen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 12/517,336

(22) PCT Filed: May 7, 2008

(86) PCT No.: PCT/EP2008/055630

§ 371 (c)(1),
(2), (4) Date: Jun. 2, 2009

(87) PCT Pub. No.: WO2008/148618

PCT Pub. Date: Dec. 11, 2008

(65) Prior Publication Data

US 2010/0071661 A1    Mar. 25, 2010

(30) Foreign Application Priority Data

Jun. 6, 2007    (DE) .................... 10 2007 026 443

(51) Int. Cl.
*F02M 7/28* (2006.01)
*F02B 13/10* (2006.01)
*F02B 7/00* (2006.01)
*F02D 41/06* (2006.01)

(52) U.S. Cl. ............... 123/435; 123/431; 123/576; 123/578; 123/491

(58) Field of Classification Search ............. 123/431, 123/575, 576, 578, 435, 304, 305, 491
See application file for complete search history.

(56) References Cited

U.S. PATENT DOCUMENTS 5,179,926 A    1/1993    Ament

FOREIGN PATENT DOCUMENTS

| DE | 40 25 018 | 2/1991 |
|---|---|---|
| DE | 40 35 503 | 5/1991 |
| EP | 1 055 810 | 11/2000 |
| EP | 1 178 203 | 2/2002 |
| EP | 1 363 004 | 11/2003 |
| EP | 1 496 228 | 1/2005 |

*Primary Examiner*—Hai H Huynh
(74) *Attorney, Agent, or Firm*—Merchant & Gould P.C.

(57) ABSTRACT

A method for starting an internal combustion engine that is operated with a fuel mixture made of at least two types of fuel. An injection of the fuel into combustion chambers of the internal combustion engine occurs starting at a predefined pressure threshold of the fuel in a fuel supply according to a high-pressure starting mode, and also according to a low-pressure starting mode if the predefined pressure threshold is no longer met. The pressure threshold is selected as a function of the mixture ratio of the fuel types in the fuel mixture. In this way it can be achieved that differences can be taken into consideration in the optimal mixture formation of the fuel types.

5 Claims, No Drawings

METHOD FOR FUEL INJECTION

TECHNICAL FIELD

The invention relates to a method for starting an internal combustion engine, which is operated with a fuel mixture made of at least two types of fuel, wherein an injection of the fuel into combustion chambers of the internal combustion engine occurs starting at a predefined pressure threshold of the fuel in a fuel supply according to a high-pressure starting mode and also according to a low-pressure starting mode if the predefined pressure threshold is no longer met.

BACKGROUND

Internal combustion engines on the basis of Otto engines are generally operated with fuel from hydrocarbons from fossil fuels on the basis of refined crude oil. Ethanol produced from renewable resources (plants) or another alcohol is increasingly being added to this fuel in different mixing ratios. In the USA and Europe a blend of 70-85% ethanol and 15-30% gasoline is often used under the brand name E85. The internal combustion engines are designed in such a way that they can be operated with pure gasoline as well as with blends up to E85. This is designated as a "flex fuel operation". The operating parameters in the flex fuel operation have to be adapted to the respectively prevailing fuel blend in order for a fuel efficient operation with low pollutant emissions to occur, while a high degree of engine performance and an ease in starting are simultaneously maintained. An exemplary stoichiometric fuel/air ratio exists at 14.7 parts of air to each part of gasoline; however, when using pure ethanol, an air amount of 9 parts has to be set.

When starting Otto engines (spark-ignited internal combustion engines), a high-pressure injection of the fuel is only then enabled when a predefined threshold for the pressure in the injection system is achieved. The reason for this is that a good quality of atomization can only then be achieved at or above said threshold. The high-pressure injection in an Otto engine with direct gasoline injection is, for example, only then enabled if a temperature dependent threshold of the fuel pressure in a fuel distribution line is achieved, as would ideally be the case in a common rail pressure reservoir. A high-pressure start ideally means that a majority of the fuel quantity provided for a combustion stroke is injected during an intake stroke of the internal combustion engine under high pressure into a combustion chamber and causes a homogeneous cylinder charging. In a subsequent compression phase, an additional injection occurs, which causes a stratified charge. Provision can be made for a third injection phase shortly after the ignition point. The fuel quantity provided can also alternatively be deposited in only one injection during the compression phase.

When the pressure is lower than the threshold pressure, the injection in the low pressure operating mode is operated with altered injection parameters. An injection during a low pressure starting mode typically occurs in up to three partial injections, which all occur prior to the ignition point. In so doing, a good distribution of the fuel in the combustion chamber is achieved on the one hand, and furthermore a decrease in the drop in pressure in the common rail is also achieved. The injection cycles can be selected in such a way that an ingress of the gas mixture from the combustion chamber into the injector is prevented despite the low fuel pressure. The threshold value of the fuel pressure can thereby be selected as a function of the temperature of a coolant or of the combustion chamber of the internal combustion engine. When temperatures are low, fuel increasingly condenses on the cylinder walls, is emitted in an uncombusted state into the atmosphere and thereby increases the toxic emissions. Said emissions are reduced during a low-pressure start by a decrease in the initial injected fuel quantity, which decreases the amount of condensation of fuel on the cylinder wall. Provision can be made for the selection of the injection parameters to exclusively cause a stratified charge in the combustion chamber.

Emissions during starting can be reduced and a starting procedure with a reduced likelihood of misfires occurs as a result of the approach described above. A low-pressure start likewise generally occurs below a minimum and above a maximum temperature of, for example, the coolant. The low-pressure start ideally occurs below −15° C. and above 90° C. A high-pressure start occurs in the temperature range between the aforementioned values if a sufficient operating pressure of ideally 10 bar is achieved. If such an Otto engine is operated with a gasoline-ethanol mixture, the composition of said mixture must be taken into consideration during starting in order to achieve a flawless starting behavior. This is not taken into consideration in the technical field.

SUMMARY

It is the task of the invention to state a method, which allows for a starting behavior as during an operation with pure gasoline when using a gasoline-ethanol mixture (flex fuel operation) or when using a fuel mixture of a different composition.

DETAILED DESCRIPTION

The task of the invention is thereby solved, in that the pressure threshold is selected as a function of the mixture ratio of the fuel types in the fuel mixture. In this way it can be achieved that differences can be taken into consideration in the optimal mixture formation of the fuel types. When using a gasoline-ethanol mixture, it can thus be taken into consideration that in order to achieve optimized ignition and combustion behaviors when starting a spark-ignited internal combustion engine, a higher amount of fuel must be injected for a mixture rich in ethanol than for a mixture rich in gasoline in that the pressure threshold selected for a high-pressure ignition is higher when using a mixture rich in ethanol. If in the case of a mixture rich in ethanol the pressure threshold selected is higher than in the case of a mixture low in ethanol, the reserve for pressure drops is also higher, and quantity errors due to pressure dynamics have less impact. Both effects improve the starting behavior of fuel mixture rich in ethanol.

Provision is made in one form of embodiment for the method according to the invention to be used with a fuel, in which the fuel mixture is formed from gasoline and ethanol. This fuel mixture is used in the USA and Europe. Provision is made for motor vehicles, which are operated with this fuel mixture, to be able to be fueled with a fuel mixture of a predefined composition, for example E85, as well as with gasoline or ethanol. This operation, which is designated as the flex fuel operation, has the effect that an arbitrary composition of the fuel mixture between pure gasoline and pure ethanol can exist after a filling of the tank (fueling). The composition of the fuel mixture must be taken into consideration when the fuel is being metered in the operation as well as when starting the engine. When starting the engine, the composition of the fuel mixture is known from the last driving cycle or from an assessment after the tank has been filled (after fueling). Provision can also be made for an ethanol sensor for determining the ethanol content. From the aforementioned data, the pressure threshold for enabling a high-pressure start can be adjusted according to the invention to guarantee an optimal starting procedure.

If the pressure threshold is defined as a function of the percentage of one of the fuel types and/or as a function of the temperature of a coolant and/or a combustion chamber of the internal combustion engine and/or of the fuel mixture and/or the ambient air and/or the intake air, the starting behavior of the internal combustion engine can be further improved. When determining the pressure threshold, not all of the components of the fuel mixture have to be taken into consideration. It is often sufficient to take just one of the components into consideration, as, for example, the ethanol content. The starting behavior is further improved by taking the temperature of the system into consideration when a high-pressure start is being enabled. The temperature to be taken into consideration can thereby be formed from one or a plurality of temperatures, which characterize the system. Provision can be made according to the invention for the pressure threshold to be cumulatively composed of a pressure threshold as a function of the percentage of a fuel type and of a pressure threshold as a function of the temperature.

Provision is made in a modification of the method according to the invention for the pressure threshold to be defined in an engine characteristic map as a function of the temperature of the coolant and/or the combustion chamber of the internal combustion engine and/or the fuel and/or the ambient air and/or the intake air and as a function of the mixture ratio of the fuel types in the fuel mixture.

Provision is made in a variation of the method, which takes into consideration the vaporization behavior of the fuel types at low temperatures, for a low-pressure start to occur below a first predefined temperature threshold and above a second predefined temperature threshold, for a high-pressure start to occur in a temperature range between the first and the second temperature threshold and for the first and the second temperature threshold to be defined as a function of the composition of the fuel mixture. In this variation of the method, the fact is also taken into consideration that a sufficiently high fuel pressure cannot be reliably provided when the system temperature is high.

The invention claimed is:

1. A method of starting an internal combustion engine that is operated with a fuel mixture comprising at least two types of fuel, the method comprising:
    starting an injection of the fuel mixture into a plurality of combustion chambers of the internal combustion engine at a predefined pressure threshold of the fuel according to a high-pressure starting mode; and
    injecting the fuel mixture according to a low-pressure starting mode if the predefined pressure threshold is no longer met, wherein the predefined pressure threshold is defined as a function of a fuel mixture ratio of the at least two fuel types of the fuel mixture.

2. The method according to claim 1, further comprising injecting a fuel mixture comprising of a mixture of gasoline and ethanol.

3. The method according to claim 1, further comprising defining the pressure threshold as a function of one or more of: a) a percentage of one of the at least two fuel types; b) a temperature of a coolant; c) a temperature of a combustion chamber; d) a temperature of the fuel mixture; e) a temperature of ambient air; and d) a temperature of intake air.

4. The method according to claim 3, further comprising defining the pressure threshold in an engine characteristic map as a function of one or more of: a) the temperature of the coolant; b) the temperature of the combustion chamber; c) the temperature of the fuel mixture; d) the temperature of ambient air; e) the temperature of intake air; and f) the fuel mixture ratio.

5. The method according to claim 4, wherein a low-pressure start occurs below a first predefined temperature threshold and above a second predefined temperature threshold and a high-pressure start occurs in a temperature range between the first and the second temperature threshold, and wherein the first and the second temperature threshold are defined as a function of a composition of the fuel mixture.

* * * * *